United States Patent
Han et al.

(10) Patent No.: US 10,726,612 B2
(45) Date of Patent: Jul. 28, 2020

(54) METHOD AND APPARATUS FOR RECONSTRUCTING THREE-DIMENSIONAL MODEL OF OBJECT

(71) Applicant: Electronics and Telecommunications Research Institute, Daejeon (KR)

(72) Inventors: Byung Ok Han, Daejeon (KR); Jae Hwan Kim, Daejeon (KR); Ho Won Kim, Seoul (KR); Ji Hyung Lee, Daejeon (KR); Yu Gu Jung, Daejeon (KR); Chang Joon Park, Daejeon (KR); Gil Haeng Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 55 days.

(21) Appl. No.: 16/104,431

(22) Filed: Aug. 17, 2018

(65) Prior Publication Data
US 2019/0392632 A1    Dec. 26, 2019

(30) Foreign Application Priority Data

Jun. 22, 2018    (KR) .................. 10-2018-0071997

(51) Int. Cl.
*G06T 17/00*    (2006.01)
*G06T 7/73*    (2017.01)
*G06K 9/46*    (2006.01)
*G06T 7/194*    (2017.01)
*G06T 7/55*    (2017.01)
(Continued)

(52) U.S. Cl.
CPC ............ *G06T 17/00* (2013.01); *G06K 9/46* (2013.01); *G06T 7/194* (2017.01); *G06T 7/55* (2017.01); *G06T 7/73* (2017.01); *H04N 5/2258* (2013.01); *H04N 9/045* (2013.01); *G06T 2200/08* (2013.01); *G06T 2207/10024* (2013.01); *G06T 2207/10028* (2013.01); *G06T 2207/20081* (2013.01)

(58) Field of Classification Search
USPC ........................................................ 348/135
See application file for complete search history.

(56) References Cited

U.S. PATENT DOCUMENTS 9,208,607 B2    12/2015    Chu et al.
9,554,121 B2    1/2017    Kang et al.
(Continued)

FOREIGN PATENT DOCUMENTS

KR    1020170086799 A    7/2017
KR    101784584 B1    10/2017

*Primary Examiner* — Behrooz M Senfi
(74) *Attorney, Agent, or Firm* — William Park & Associates Ltd.

(57) ABSTRACT

Provided is a method of reconstructing a three-dimensional (3D) model of an object. The method includes sequentially performing, by a camera module, first and second object scanning processes of scanning the same object, reconstructing, by a processor module, a 3D object model, based on a first object image obtained through the first object scanning process, performing pose learning on an object to generate learning data, based on data obtained through a process of reconstructing the 3D object model based on the first object image, and reconstructing, by the processor module, a final 3D object model, based on a second object image obtained through the second object scanning process and the learning data.

18 Claims, 6 Drawing Sheets

(51) Int. Cl.
*H04N 9/04* (2006.01)
*H04N 5/225* (2006.01)

(56) References Cited

U.S. PATENT DOCUMENTS

| | | | |
|---|---|---|---|
| 2012/0147004 A1* | 6/2012 | Choi | G06T 13/40 |
| | | | 345/420 |
| 2012/0306876 A1 | 12/2012 | Shotton et al. | |
| 2013/0207966 A1 | 8/2013 | Chu et al. | |
| 2016/0227196 A1 | 8/2016 | Kang et al. | |
| 2017/0213385 A1* | 7/2017 | Yu | G06K 9/4604 |
| 2019/0362157 A1* | 11/2019 | Cambias | G06K 9/00744 |

* cited by examiner

METHOD AND APPARATUS FOR RECONSTRUCTING THREE-DIMENSIONAL MODEL OF OBJECT

CROSS-REFERENCE TO RELATED APPLICATIONS

This application claims priority under 35 U.S.C. § 119 to Korean Patent Application No. 10-2018-0071997, filed on Jun. 22, 2018, the disclosure of which is incorporated herein by reference in its entirety.

TECHNICAL FIELD

The present invention relates to a method and apparatus for reconstructing a three-dimensional (3D) model of an object, and more particularly, to a method and apparatus for reconstructing a 3D model of an object by using image scenes generated by scanning the object.

BACKGROUND

Recently, as mobile phones equipped with a consumer-level small camera such as a depth sensor are popularized, interest in three-dimensional (3D) reconstruction technology for reconstructing a 3D model of a real object in the mobile phones is increasing.

The 3D reconstruction technology is technology which scans a real object with a small camera to generate image scenes, and reconstruct a 3D model of the real object by using the generated image scenes.

In order to reconstruct a 3D model of a real object, it is very important to stably and completely scan a whole shape of the real object. However, it is very difficult to stably and completely scan the whole shape of the real object by using a small camera equipped in a mobile phone. For example, in a state where one hand grasps the real object and another hand grasps the mobile phone, if the real object is scanned while moving the small camera equipped in the mobile phone in several directions, a region hidden by at least one of the hands occurs, and due to this, it is unable to completely scan the whole shape of the real object.

As described above, a scanning operation performed in an unstable pose causes drift and jittering to reduce an accuracy of the scanning operation. For this reason, an accuracy of tracking a pose of a real object in a 3D reconstruction process of reconstructing a 3D model of the real object is reduced, causing the display quality of the reconstructed 3D model.

Moreover, due to the low performance of a small camera equipped in a mobile phone, apertures or cavities are seen in a 3D model image reconstructed from image scenes obtained from the small camera. This denotes a reduction in display quality of a 3D model.

SUMMARY

Accordingly, the present invention provides a method and apparatus for reconstructing a fine three-dimensional (3D) model by stably performing a scanning operation on an object in a portable device.

In one general aspect, a method of reconstructing a 3D model of an object includes: sequentially performing, by a camera module, first and second object scanning processes of scanning the same object; reconstructing, by a processor module, a 3D object model, based on a first object image obtained through the first object scanning process and performing pose learning on an object to generate learning data, based on data obtained through a process of reconstructing the 3D object model based on the first object image; and reconstructing, by the processor module, a final 3D object model, based on a second object image obtained through the second object scanning process and the learning data.

In another general aspect, a method of reconstructing a 3D model of an object includes: sequentially performing, by a camera module, first and second object scanning processes of scanning the same object; estimating, by a processor module, first pose data of the object, based on first feature data extracted from a first object image obtained through the first object scanning process and reconstructing a 3D object model, based on the first pose data; estimating second pose data of the object, based on $2\text{-}1^{th}$ feature data of the object extracted from a second object image obtained through the second object scanning process, $2\text{-}2^{th}$ feature data of the object extracted from a two-dimensional (2D) object image where the 3D object model is projected onto a 2D plane, and the first pose data; and reconstructing a final 3D object model, based on the second pose data.

In another general aspect, an apparatus for reconstructing a 3D model of an object includes: a camera module sequentially performing first and second object scanning processes of scanning the same object; and a processor module reconstructing a 3D object model, based on a first object image obtained through the first object scanning process, performing pose learning on an object to generate learning data, based on data obtained through a process of reconstructing the 3D object model based on the first object image, and reconstructing a final 3D object model, based on a second object image obtained through the second object scanning process and the learning data.

Other features and aspects will be apparent from the following detailed description, the drawings, and the claims.

DETAILED DESCRIPTION OF EMBODIMENTS

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

As used herein, the term "or" includes any and all combinations of one or more of the associated listed items. For example, "A or B" may include A, include B, or include A and B.

It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the present invention, and similarly, the second element may also be referred to as the first element.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

In the following description, the technical terms are used only for explain a specific embodiment while not limiting the present invention. The terms of a singular form may include plural forms unless referred to the contrary.

Unless otherwise defined, all terms (including technical and scientific terms) used herein have the same meaning as commonly understood by one of ordinary skill in the art to which example embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
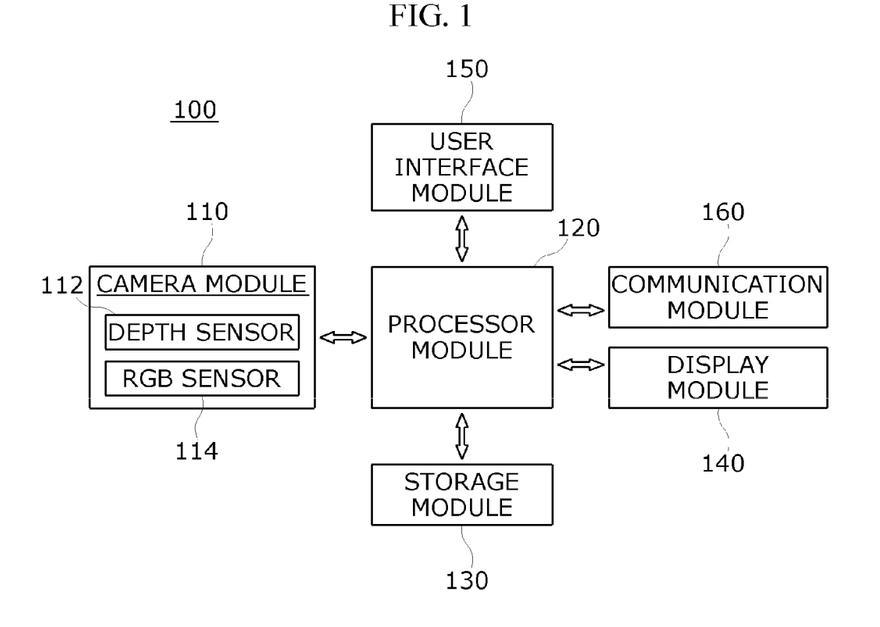
FIG. 1 is a block diagram of a 3D model reconstructing apparatus according to an embodiment of the present invention.

FIG. 1 is a block diagram of a three-dimensional (3D) model reconstructing apparatus according to an embodiment of the present invention.

Referring to FIG. 1, the 3D model reconstructing apparatus according to an embodiment of the present invention may be a portable electronic device 100 for reconstructing a 3D model of an object having an arbitrary shape.

The portable electronic device 100 may be a device which performs a process of reconstructing a 3D model of a real object by using image scenes (hereinafter referred to as images) generated by scanning the real object, and the kinds of devices are not limited thereto.

The portable electronic device 100 may be, for example, one of a smartphone, a tablet personal computer (PC), a mobile phone, a video phone, an e-book reader, a personal digital assistant (PDA), a portable multimedia player (PMP), and a vehicle head unit attachable/detachable on/from vehicles.

However, the present embodiment is not limited to the portable electronic device 100, and for example, may be applied to devices, which are inconvenient for a user to carry, such as desktop PCs, workstations, and servers.

In order to reconstruct a 3D model of a real object, the portable electronic device 100 may include, for example, a camera module 110, a processor module 120, a storage module 130, a display module 140, a user interface module 150, and a communication module 160. The modules 110 to 160 may be connected to one another through a system bus.

The camera module 110 may be a module which scans a real object having an arbitrary shape to capture a plurality of images at different viewpoints.

The camera module 110 may be implemented with, for example, a monocular camera, a color sensor (or an RGB sensor), a depth sensor, a multi-view stereo camera, or a combination thereof, but the kinds of cameras are not limited. However, in the present specification, the camera module 110 may be assumed as including a depth sensor 112 and a color sensor 114.

The depth sensor 112 and the color sensor 114 may not be implemented as high performance hardware, and for example, may be implemented as low performance/low power hardware. When each of the depth sensor 112 and the color sensor 114 is implemented as a low performance/low power sensor, a user may recognize the technical effect of the present invention, namely, performance enhanced for tracking a pose of an object.

A scanning process performed by the camera module 110 may include a background scanning process and an object scanning process.

The background scanning process may be a process of scanning a background of a specific space where a real object is to be placed. That is, the background scanning process may photograph a whole background in a state where a user allows a viewpoint (or an orientation) of the camera module 110 to face the background in a specific space where there is no object.

The depth sensor 112 or the color sensor 114 may be used in background scanning Therefore, a background image obtained by the background scanning process may include depth images capable of being obtained by the depth sensor 112 or color images capable of being obtained by the color sensor 114.

When the background scanning process ends, the object scanning process may be performed.

The object scanning process may be a process of scanning a real object with the camera module 110 in a specific space where the real object is to be placed. That is, the object scanning process may be a process of photographing a real object while freely moving the camera module 110 in all directions in a state where a user allows a viewpoint of the camera module 110 to face the fixed real object. On the other hand, the object scanning process may be a process of capturing an image of a real object with the fixed camera module 110 while freely moving the real object in a state where the real object faces the fixed viewpoint of the camera module 110.

The object scanning process may be a process of capturing an image of a real object with the fixed camera module 110 while freely moving the real object in a state where the real object faces the fixed viewpoint of the camera module 110. In this case, a means for moving an object and the camera module 110 may be a hand of a user.

The object scanning process may include a first object scanning process and a second object scanning process.

An object image obtained based on the first object scanning process may be used as an image for obtaining 3D model data and pose data used for initial learning. The object image obtained based on the first object scanning process may include a plurality of color images or a plurality of depth images having different viewpoints.

The second object scanning process may be performed after the first object scanning process. An object image obtained based on the second object scanning process may include a plurality of color images or a plurality of depth images having different viewpoints.

The object image obtained based on the second object scanning process may be used as an image for obtaining 3D model data and pose data which are updated based on learning data based on initial learning.

The first object scanning process may be a scanning process of obtaining 3D model data and pose data (i.e., learning data) used for initial learning, and thus, may be referred to as a coarse scanning process.

The second object scanning process may be a scanning process which is performed for obtaining fine and accurate pose data and 3D model data by obtaining the pose data and the 3D model data updated based on the learning data, and thus, may be referred to as a fine scanning process.

Hereinafter, the first object scanning process may be referred to as a coarse scanning process, and the second object scanning process may be referred to as a fine scanning process.

In an embodiment of the present invention, an object image obtained based on the coarse scanning process may be limited as a depth image, and an object image obtained based on the fine scanning process may be limited as a color image.

In other embodiments, an object image obtained based on the coarse scanning process may be limited as a color image, and an object image obtained based on the fine scanning process may be limited as a depth image.

As described below, pose data of an object may be estimated based on feature data of the object extracted from an object image. In this case, a feature of an object is capable of being extracted from a depth image irrespective of the presence or not of a color feature, but a probability of failing to a feature from an object having no surface flection is high.

On the other hand, a feature of an object is capable of being extracted from a color image irrespective of the presence or not of surface flection, but a probability of failing to a feature from an object having no color feature is high. A failure of feature extraction causes a pose estimation error of an object.

In order to prevent the pose estimation error, pose data of an object estimated from a depth image may be used as data for complementing pose data of an object estimated from a color image, or pose data of an object estimated from a color image may be used as data for complementing pose data of an object estimated from a depth image.

For example, in a case where feature data of the same object is extracted from each of a depth image and a color image and a pose of the object is estimated based on the color image, the pose of the object may be estimated by using feature data extracted from the color image and feature data extracted from the depth image, and thus, an error of pose estimation is prevented. That is, more accurate and fine pose extraction may be performed, and thus, the display quality of a 3D model is enhanced.

The processor module 120 may perform a process of extracting a feature of an object included in an image by using images generated based on the scanning process performed by the camera module 110, a process of tracking the object (or the object included in the image), based on the extracted feature, and a process of reconstructing a 3D model of a real object, based on a result of the tracking.

A process of tracking an object may be an operation of tracking a pose of the object. A pose of the object may be estimated through the operation of tracking the pose of the object.

A pose of an object may be relatively relevant to a pose of the camera module 110, and thus, tracking of a pose of an object may be referred to as tracking of a pose of the camera module 110. A pose tracking result may be data including three axis position data and three axis orientation data, and thus, may be referred to as pose data (or pose information).

Particularly, in order to prevent a failure of object tracking based on an unstable scanning operation, the processor module 120 may learn previously estimated pose data of an object and currently estimated pose data of the object and may reconstruct a 3D model of the object, based on the learned pose data of the object.

Online learning may be repeated until the display quality of the reconstructed 3D model satisfies a user. Therefore, the processor module 120 may accurately reconstruct a 3D model of a real object despite an unstable scanning operation performed on the real object.

In order to reconstruct a 3D model, the processor module 120 may be implemented with, for example, at least one central processing unit (CPU), at least one graphic processing unit (GPU), or a combination thereof.

The processor module 120 may not be implemented as a high performance and high power processor, and for example, may be implemented as a low performance and low power processor. When the processor module 120 is implemented as a low performance and low power processor, a user may recognize the technical effect of the present invention, namely, performance enhanced for tracking a pose of an object.

The storage module 130 may be a module which stores pieces of software necessary for performing, by the processor module 120, a 3D reconstruction process.

The pieces of software may include, for example, an algorithm associated with extraction of a feature of an object, an algorithm associated with extraction of a silhouette of an object, an algorithm for extracting features such as global geometric information and local geometric information about an object, an algorithm associated with tracking of a pose of an object, an algorithm for learning features of objects and a relationship between the objects, an algorithm associated with a process of projecting a 3D model onto a two-dimensional (2D) space, an interactive closest point (ICP) algorithm, a ray casting algorithm, and an algorithm associated with reconstruction of a 3D model.

Moreover, the storage module 130 may temporarily or permanently store final data and intermediate data generated by performing an object pose estimation process and a 3D reconstruction process. The storage module 130 may include a volatile memory such as random access memory (RAM) and a non-volatile memory such as read-only memory (ROM).

The display module 140 may help a user in order for the camera module 110 to accurately face a real object and may display a state where the 3D reconstruction process is being performed, and for example, may display information about a final result such as a textured mesh of an object.

The reconstructed 3D model may be displayed on a display screen included in the display module 140. The user may touch the display screen to check a 3D model of an object while laterally, upward, and downward rotating the 3D model displayed on the display screen.

The user interface module 150 may include one or more buttons, microphones, and speakers. The user interface module 150 may generate a scanning start command and a scanning end command, based on a user input. The user interface module 150 may be used for interacting with the textured mesh of the object.

The communication module 160 may communication-connect the portable electronic device 100 to an external device (not shown) by using wired or wireless communication. The communication module 160 may transmit result data (for example, 3D model data (the textured mesh of the object)), obtained through processing by the processor module 120, to the external device.

The external device may include one or more printing means and another electronic device. Here, the printing means may be a device which receives, through the communication module 160, 3D model data reconstructed by the processor module 120 and performs 3D printing, based on the received 3D model data.

A hardware configuration of the portable electronic device 100 according to an embodiment of the present invention is not limited to the illustration of FIG. 1. Unlike the illustration of FIG. 1, the portable electronic device 100 may include additional elements, or may not include some of the above-described elements. For example, the display module 140 may include a touch screen which displays a user interface (UI) for controlling scanning of a real object. In this case, the UI may be used for the user to change a scanning angle or a scanning time and may be used to execute other functions necessary for the 3D reconstruction process.

Hereinafter, the 3D reconstruction process performed by the processor module 120 illustrated in FIG. 1 will be described in more detail with reference to FIG. 2.

Figure 2:
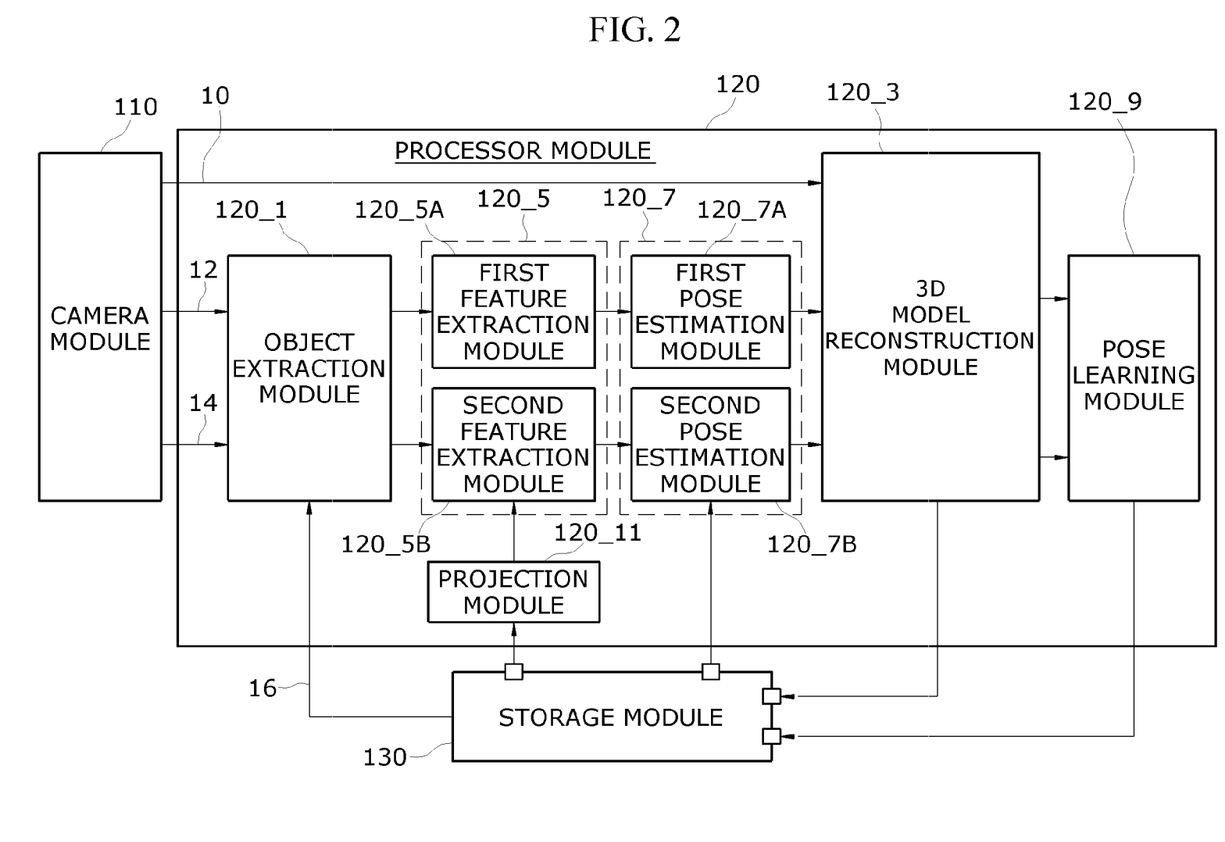
FIG. 2 is a block diagram schematically illustrating an internal configuration of a processor module illustrated in FIG. 1.

FIG. 2 is a block diagram schematically illustrating an internal configuration of the processor module 120 illustrated in FIG. 1. For conciseness of the drawing, the display module 140, the user interface module 150, and the communication module 160 illustrated in FIG. 1 are omitted in FIG. 2.

The processor module 120 may include an object extraction module 120_1, a 3D model reconstruction module 120_3, a feature extraction module 120_5, a pose estimation module 120_7, a pose learning module 120_9, and a projection module 120_11, for reconstructing a 3D model of a real object.

First, in order to reconstruct a 3D background model (or 3D background model data), a background image 10 obtained based on background scanning may be input to the pose estimation module 120_7. Here, the background image 10 may include a plurality of depth images or a plurality of color images captured at different viewpoints.

The 3D model reconstruction module 120_3 may perform a process of reconstructing a 3D background model (or 3D background model data) by using a 3D model reconstruction algorithm, based on the background image 10 obtained through background scanning. The reconstructed 3D background model may be stored in the storage module 130.

The 3D model reconstruction algorithm may be, for example, Kinect Fusion algorithm. The Kinect Fusion algorithm does not correspond to a feature of the present invention and is technology well known to those skilled in the art. Therefore, a description of the Kinect Fusion algorithm is omitted.

When the reconstruction of the 3D background model ends, the 3D model reconstruction module 120_3 may coarsely reconstruct a coarse 3D object model of an object, based on an object image obtained through coarse object scanning and may reconstruct a fine 3D object model of the same object, based on an object image obtained through fine object scanning.

An object extraction process, a feature extraction process, and a pose estimation process may be performed for reconstructing the coarse 3D object model and the fine 3D object model.

Object Extraction Module 120_1

The object extraction module 120_1 may be a module for performing the object extraction process and may perform a process of extracting a foreground including an object from a first object image 12 obtained through coarse object scanning by using a 3D background model.

That is, the object extraction module 120_1 may compare a 3D background model 16 input from the storage module 130 with the first object image 12 input from the camera module 110 to remove a background corresponding to the 3D background model from the first object image 12, thereby separating and extracting the foreground from the first object image 12. Here, the first object image 12 may include a plurality of object images having different viewpoints, and each of the plurality of object images may be a depth image or a color image. Hereinafter, the first object image 12 (i.e., an image obtained through coarse object scanning) may be referred to as a depth image.

Here, when the extraction of the foreground from the first object image 12 ends, the object extraction module 120_1 may perform a process of extracting a foreground including the same object from a second object image 14 obtained through fine object scanning.

That is, the object extraction module 120_1 may compare the 3D background model 16 input from the storage module 130 with the second object image 14 input from the camera module 110 to remove a background corresponding to the 3D background model from the second object image 14, thereby separating and extracting the foreground from the second object image 14.

Here, the second object image 14 may include a plurality of object images having different viewpoints, and each of the plurality of object images may be a depth image or a color image. Hereinafter, the second object image 14 (i.e., an image obtained through fine object scanning) may be assumed as a color image.

Various known algorithms such as a background subtraction algorithm, a foreground extraction algorithm, and an object separation algorithm may be used for extracting an object from an object image. An algorithm associated with object extraction does not correspond to a feature of the present invention and is technology well known to those skilled in the art. Therefore, a description of the algorithm is omitted.

Feature Extraction Module 120_5

The feature extraction module 120_5 may be a module for extracting feature data of an object from the object extracted by the object extraction module 120_1 and may include a first feature extraction module 120_5A and a second feature extraction module 120_5B.

The first feature extraction module 120_5A may perform a process of executing a first feature extraction algorithm to extract coarse first feature data for object tracking from a depth image 12 obtained through coarse object scanning Here, the first feature data may be a key point representing an object feature. Therefore, the kinds of algorithms are not limited, and the first feature extraction algorithm may use all algorithms capable of extracting the key point from the depth image 12.

When the extraction of the feature data from the object is completed by the first feature extraction module 120_5A, the second feature extraction module 120_5B may perform a process of executing a second feature extraction algorithm to extract $2\text{-}1^{th}$ feature data for tracking the same object as the object the depth image 12 from a color image 14 obtained through fine object scanning. Here, the $2\text{-}1^{th}$ feature data may be data for region-based object tracking and may include global feature data and local feature data. Therefore, the kinds of algorithms are not limited, and the second feature extraction algorithm may use all algorithms capable of extracting the global feature data and the local feature data. For example, the global feature data may be data representing an appearance shape (or a silhouette) of the object, and the local feature data may be data representing an internal feature of the object. As another example, the global feature data may be data based on red (R), green (G), and blue (B) values of a color image, and the local feature data may be data based on hue (H), saturation (S), and value (V) values of the color image.

Additionally, the second feature extraction module 120_5B may perform a process of extracting $2\text{-}2^{th}$ feature data from a 2D object image where a 3D object model reconstructed based on the first feature data from the first feature extraction module 120_5A is projected onto a 2D plane.

That is, the second feature extraction module 120_5B may extract the $2\text{-}1^{th}$ feature data extracted from the color image 14 currently obtained through fine object scanning and the $2\text{-}2^{th}$ feature data extracted from the 3D object model previously reconstructed through coarse object scanning Pose Estimation Module 120_7

The pose estimation module 120_7 may be a module for performing an object pose estimation process based on the feature data extracted by the feature extraction module and may include a first pose estimation module 120_7A and a second pose estimation module 120_7B.

The first pose estimation module 120_7A may perform the object pose estimation process based on the first feature data of the object from the depth image obtained through coarse object scanning.

In detail, the first pose estimation module 120_7A may calculate a vertex map and a normal map from the first feature data input from the first feature extraction module 120_5A and may estimate first pose data of the object by using an interactive closest point alignment technique, based on the calculated vertex map and normal map.

The second pose estimation module 120_7B may perform a fine pose estimation process on the object, based on the $2\text{-}1^{th}$ feature data of the object extracted from the color image obtained through fine object scanning and the $2\text{-}2^{th}$ feature data extracted from the 2D object image where the 3D object model reconstructed based on the first feature data is projected onto the 2D plane.

For example, the second pose estimation module 120_7B may calculate a vertex map and a normal map from the second feature data input from the second feature extraction module 120_5B and may estimate second pose data of the object by using the interactive closest point alignment technique, based on the calculated vertex map and normal map.

As another example, as described below, the second pose estimation module 120_7B may perform initial learning, based on the 3D object model constructed and the first pose data estimated based on the depth image obtained through coarse object scanning and may estimate the second pose data, further based on learning data obtained through the initial learning.

As described above, the second pose data according to an embodiment of the present invention may be data which is obtained by estimating the pose of the object, based on a feature (the $2\text{-}1^{th}$ feature data) extracted from the color image currently obtained through fine object scanning, a feature (the $2\text{-}2^{th}$ feature data) extracted from the depth image previously obtained through coarse object scanning, and the learning data, and thus, may have high accuracy and precision. Accordingly, the 3D object model reconstructed based on the second pose data may provide very good display quality where accuracy and precision are maximized.

3D Model Reconstruction Model 120_3

The 3D model reconstruction model 120_3 may perform a process of reconstructing a 3D object model, based on the pose data of the object estimated by the pose estimation module 120_7.

In detail, the 3D model reconstruction module 120_3 may reconstruct a depth image-based 3D object model by using the ICP algorithm and the ray casting algorithm, based on the first pose data estimated by the first pose estimation module 120_7A.

Moreover, the 3D model reconstruction module 120_3 may reconstruct a color image-based 3D object model by using the ray casting algorithm, based on the second pose data estimated by the second pose estimation module 120_7B.

Here, the reconstructed color image-based 3D object model may be a model which is reconstructed from a feature (the $2\text{-}1^{th}$ feature data) extracted from the color image currently obtained through fine object scanning, the feature (the $2\text{-}2^{th}$ feature data) extracted from the depth image obtained through coarse object scanning, and learning data thereof, and thus, may be very high in display quality.

Learning Module 120_9

The learning module 120_9 may perform a process of generating learning data by performing initial learning on the pose of the object by using the first pose data estimated from an image (for example, the depth image) obtained through coarse object scanning by the 3D model reconstruction module 120_3 and the 3D object model (or the 3D object model data) reconstructed based on the first pose data. When the generated learning data is stored in the storage module 130, the generation of the learning data may be completed.

When the generation of the learning data ends, the learning module 120_9 may update the reconstructed 3D object model, based on pose data estimated from an image (for example, the color image) obtained through fine object scanning based on the generated learning data and a 3D object model reconstructed based on the pose data. Accordingly, an accuracy of pose estimation performed by the pose estimation module 120_7 is maximized.

As described above, the learning module 120_9 may perform online learning for correcting currently estimated pose information (for example, the second pose data) by using previously estimated pose information (for example, the first pose data) about the object, thereby stably removing a factor, which degrades display quality, such as an aperture or a cavity recognized in a 3D object model reconstructed through unstable scanning of an object. Accordingly, according to an embodiment of the present invention, a real object may freely and easily scanned by the portable electronic device, and thus, a 3D object model may be precisely reconstructed.

Moreover, the online learning performed by the learning module 120_9 may be continuously repeated until display quality satisfies a user.

Figure 3:
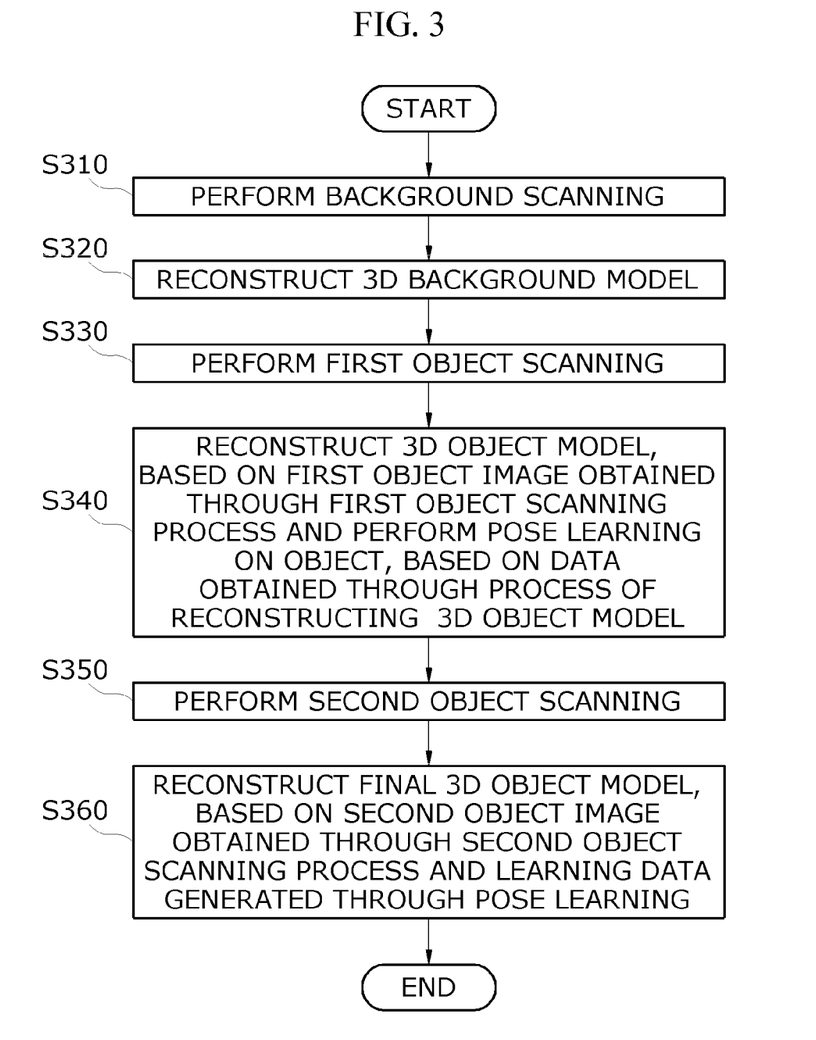
FIGS. 3 to 6 are flowcharts illustrating a method of reconstructing a 3D model of an object according to an embodiment of the present invention.

FIG. 3 is a flowchart illustrating a method of reconstructing a 3D model of an object according to an embodiment of the present invention. In order to help understand description, the method will be described with reference to FIGS. 1 and 2. Also, for conciseness of description, descriptions overlapping descriptions given above with reference to FIGS. 1 and 2 are omitted or will be briefly given in describing each of the following steps.

Referring to FIG. 3, first, in step S310, background scanning may be performed by the camera module 110. A background image 10 may be obtained through the background scanning. In this case, the background image 10 may include a plurality of images having different viewpoints, and each of the plurality of images may be a depth image or a color image.

Subsequently, in step S320, the processor module 120 may perform a process of reconstructing a 3D background model (or 3D background model data), based on the background image 10. The reconstructed 3D background model may be a model for extracting a foreground image including an object from an object image obtained through object scanning below. In order to reconstruct the 3D background model, a 3D model reconstruction algorithm such as the Kinect Fusion algorithm may be executed by the processor module 120.

Subsequently, in step S330, a first object scanning process (or a coarse scanning process) may be performed by the camera module 110. The first object scanning process may capture a plurality of object images (hereinafter referred to as first object images) of the real object at different viewpoints. The first object scanning process may be a process of obtaining coarse pose data and a coarse 3D object model (or coarse 3D object model data) for performing initial learning on a pose of the object. The first object scanning process may be performed in a state where at least one of the camera module and the real object is not fixed. A first object image obtained through the first object scanning process may be a depth image or a color image. In the present embodiment, the first object image may be assumed as a depth image.

Subsequently, in step S340, a 3D object model may be reconstructed based on the first object image obtained through the first object scanning process, and pose learning may be performed on an object, based on data obtained through a process of reconstructing the 3D object model. Here, the obtained data may include feature data (hereinafter referred to as first feature data) of the object, pose data (hereinafter referred to as first pose data) of the object, and 3D object model data. The pose learning may be for learning a relationship between the first object image and a pose of the object, based on the obtained data and may be performed by using various learning algorithms. The learning algorithms may include, for example, artificial neural network algorithms such as a machine learning algorithm and a deep learning algorithm. Learning data generated through the pose learning may be stored in the storage module 130 according to control by the processor module 120. The learning data may be continuously updated. As a result, a database including the learning data and learning data obtained through the updating may be built in the storage module 130.

Subsequently, in step S350, a second object scanning process (or a fine scanning process) may be performed by the camera module 110. The second object scanning process may capture a plurality of object images (hereinafter referred to as second object images) of the real object at different viewpoints. The second object scanning process may be a process of reflecting the learning data generated through step S350 to reconstruct a final 3D object model. The second object scanning process may scan the same object as an object scanned through the first object scanning process. Similarly to the first object scanning process, the second object scanning process may capture a plurality of object images (hereinafter referred to as second object images) of the object at different viewpoints. The second object scanning process may be performed in a state where at least one of the camera module and the real object is not fixed. A second object image obtained through the second object scanning process may be a depth image or a color image. In the present embodiment, the second object image may be assumed as a color image. An accuracy of a process of aligning texture information and geometric information for reconstructing a 3D object model is more enhanced in a case, where the object is tracked based on a color image, than a case where an object is tracked based on a depth image.

Subsequently, in step S360, the final 3D object model may be reconstructed based on the second object image obtained through the second object scanning process and the learning data which is generated through the pose learning in step S350. Such a process will be described below in detail.

Steps S310 to S360 may be divided for helping understand description, and some steps may be integrated into one step.

Figure 4:
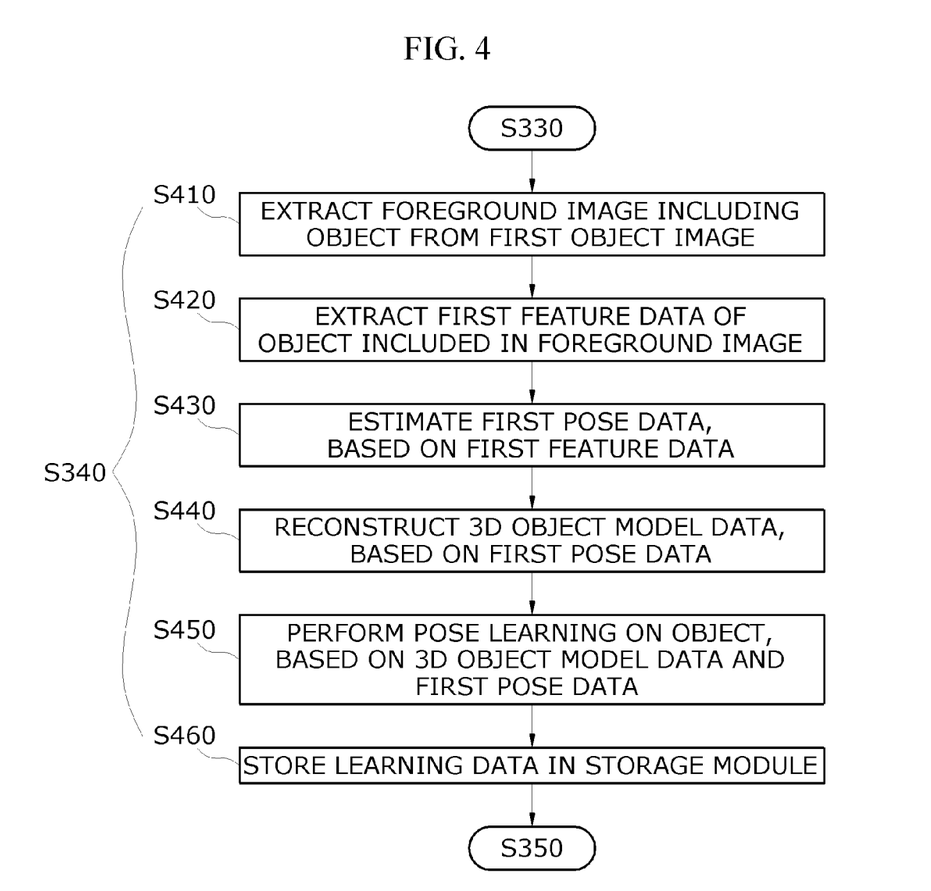

FIG. 4 is a flowchart illustrating a detailed process of step S340 illustrated in FIG. 3.

Referring to FIG. 4, first, in step S410, the processor module 120 or the object extraction module 120_1 of the processor module 120 may perform a process of extracting a foreground image including the object from the first object image (or a depth image) obtained through the first object scanning process (or the coarse scanning process). For example, the foreground image may be extracted by removing a background image corresponding to the 3D background model which is reconstructed in step S320 of FIG. 3. Various algorithms such as a background subtraction algorithm, a foreground extraction algorithm, and an object separation algorithm well known to those skilled in the art may be used for removing the background image.

Subsequently, in step S420, a process of extracting first feature data of the object from the foreground image may be performed by using a feature extraction algorithm. The feature extraction algorithm for extracting the first feature data may use, for example, an algorithm capable of extracting a key point from the depth image.

Subsequently, in step S430, by using a pose estimation algorithm, a process of extracting first pose data may be performed based on the first feature data. The pose estimation algorithm for estimating the first pose data may use an ICP algorithm. For example, a vertex map and a normal map may be calculated from the first feature data, and the first pose data of the object may be estimated based on the calculated vertex map and normal map by using the interactive closest point alignment technique.

Subsequently, in step S440, a process of reconstructing 3D object model data may be performed based on the first pose data. A ray casting algorithm may be used for reconstructing the 3D object model data.

In the present specification, the object extraction process, the feature extraction process, the pose estimation process, and the 3D model reconstruction process which are divided by units of functional processing are described, but it may be considered that the object extraction process, the feature extraction process, and the pose estimation process are included in the 3D model reconstruction process. Therefore, it may be considered that the object extraction algorithm, the ICP algorithm, and the ray casting algorithm are included in the 3D reconstruction algorithm. In this case, the object extraction module 120_1, the feature extraction module 120_5, and the pose estimation module 120_7 illustrated in FIG. 2 may be included in the 3D model reconstruction module 120_3. Also, the learning module 120_9 for performing the pose learning may be included in the 3D model reconstruction module 120_3.

Subsequently, in step S450, a process of performing the pose learning on the object may be performed based on the 3D object model data which is reconstructed in step S440 and the first pose data which is estimated in step S430.

Subsequently, in step S460, a process of storing the learning data, generated through the pose learning, in the storage module 130 may be performed. In this manner, the learning data stored in the storage module 130 may be continuously updated according to control by the processor module 120, and whenever the learning data is updated, learning data obtained through the updating may be reflected in real time in reconstructing the final 3D object model obtained through the second object scanning process.

Figure 5:
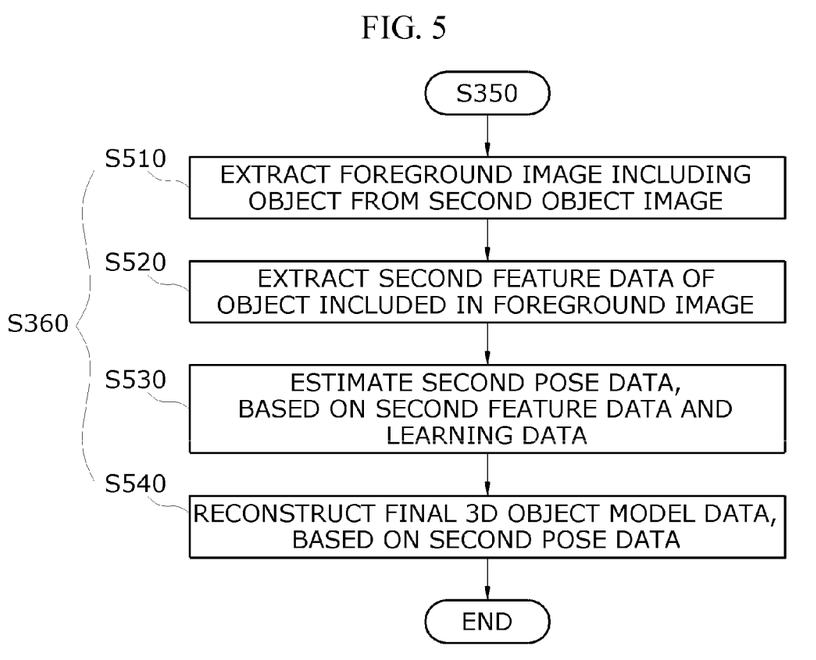

FIG. 5 is a flowchart illustrating a detailed process of step S360 illustrated in FIG. 3.

Referring to FIG. 5, first, in step S510, a process of the foreground image including the object from the second object image may be performed by using the object extraction algorithm.

Subsequently, in step S520, a process of extracting the second feature data of the object from the second object image may be performed by using the feature extraction algorithm. Here, the kind of the feature extraction algorithm is not limited, and the feature extraction algorithm may use all algorithms capable of extracting global feature data and local feature data.

Subsequently, in step S530, by using the pose estimation algorithm such as the ICP algorithm, a process of estimating the second pose data may be performed based on the second feature data and the learning data generated based on data which is obtained through a process of reconstructing the 3D object model based on the first object scanning process. For example, a pose value may be estimated based on the second feature data, and then, an intermediate value or an average value between the estimated pose value and a pose value included in the learning data may be estimated as the second pose data.

Subsequently, in step S540, by using the 3D reconstruction algorithm such as the ray casting algorithm, a process of reconstructing the final 3D object model may be performed based on the second pose data.

Figure 6:
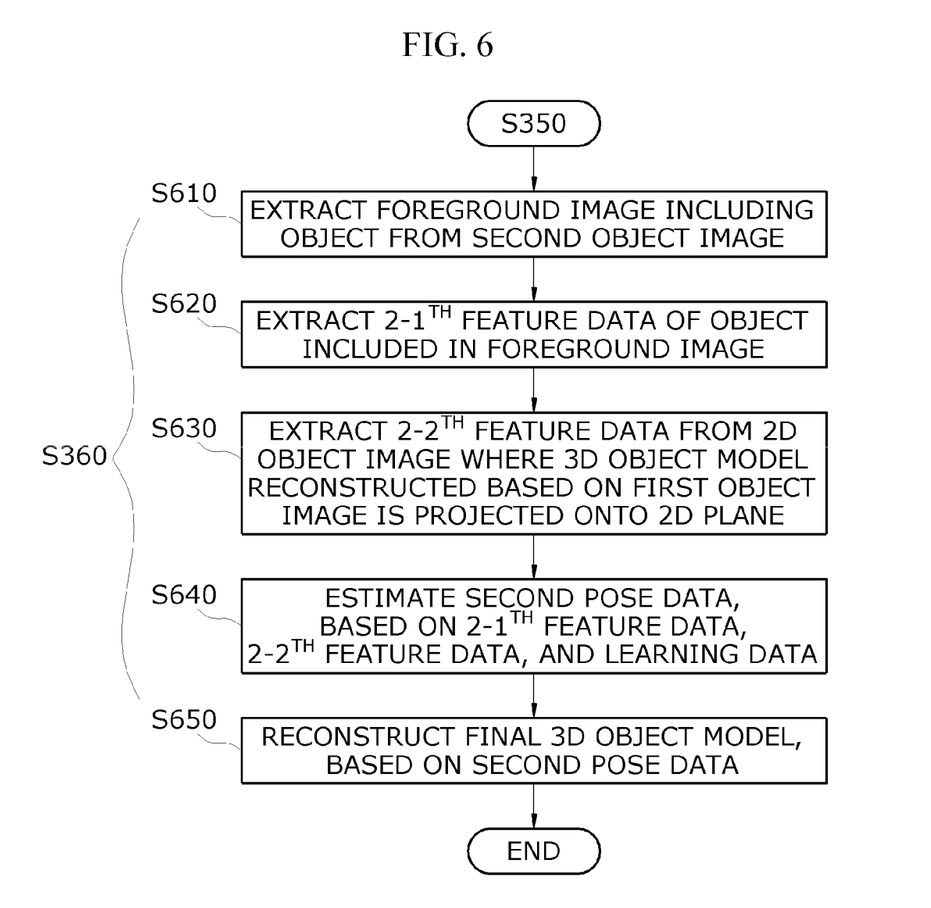

FIG. 6 is a flowchart illustrating a detailed process of step S360 illustrated in FIG. 3.

Referring to FIG. 6, first, in step S610, a process of extracting the foreground image including the object from the second object image may be performed by using the object extraction algorithm.

Subsequently, in step S620, a process of extracting 2-1$^{th}$ feature data from the second object image may be performed by using the feature extraction algorithm.

Subsequently, in step S630, a process of extracting 2-2$^{th}$ feature data from a 2D object image where the 3D object model reconstructed based on the first object image is projected onto a 2D plane may be performed by using the feature extraction algorithm. In the present embodiment, it is described that step S630 is performed after step S620, but steps S620 and S630 may be simultaneously performed. Since feature data of an object is extracted from an object image in steps S620 and S630, steps S620 and S630 may be integrated into one step.

Subsequently, in step S640, by using the pose estimation algorithm, a process of estimating the second pose data may be performed based on the 2-1$^{th}$ feature data which is extracted in step S620, the 2-2$^{th}$ feature data which is extracted in step S630, and the learning data generated through the pose learning. For example, a pose value may be estimated from the 2-1$^{th}$ feature data and the 2-2$^{th}$ feature data, and then, an intermediate value or an average value between the estimated pose value and the pose value included in the learning data may be estimated as the second pose data.

Subsequently, in step S650, by using the 3D reconstruction algorithm, a process of reconstructing the final 3D object model may be performed based on the second pose data.

Unlike the embodiment of FIG. 6, the embodiment of FIG. 5 may not perform step S630 in which the 2-2$^{th}$ feature data is extracted from the 2D object image where the 3D object model reconstructed based on the first object image is projected onto the 2D plane, based on the feature extraction algorithm. This denotes that the projection module 120_11 disclosed in the embodiment of FIG. 2 may be omitted in the embodiment of FIG. 5.

As described above, according to the embodiments of the present invention, after the 3D object model is reconstructed based on the first object image obtained through the first object scanning process, a pose of an object may be learned based on an object tracking result (i.e., pose data of the object) which is estimated in a process of reconstructing a 3D object model, and a result of the learning may be applied to a process of reconstructing the final 3D object model, based on the second object image obtained through the second object scanning process, thereby maximizing the precision and accuracy of the reconstructed final 3D object model.

Moreover, according to the embodiments of the present invention, since the depth sensor is used for performing the first object scanning process and the color sensor is used for the second object scanning process, the texture information and the geometric information may be accurately aligned in a process of reconstructing the final 3D object model, based on the color image obtained through the second object scanning process, thereby maximizing the display quality of the final 3D object model.

Such a method of reconstructing the 3D object model may be implemented in a software level without changing hardware, and thus, irrespective of hardware performance, a 3D object model having good display quality may be provided.

As a result, a portable electronic device equipped with a low performance and low power camera sensor may also provide a 3D object model having good display quality, and moreover, a degree of freedom of scanning is maintained and object scanning is stably and accurately performed.

As described above, according to the embodiments of the present invention, the failure of object (or camera) tracking caused by unstable scanning is minimized in a 3D reconstruction process using a portable device.

Moreover, according to the embodiments of the present invention, a free movement of a camera by a user is ensured for correcting apertures or cavities which occur in a reconstructed 3D model.

Moreover, according to the embodiments of the present invention, in order to scan an object, even when a scanning operation is performed while all of a camera and the object are moving at a high speed, a fine 3D model is reconstructed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of reconstructing a three-dimensional (3D) model of an object, the method comprising:
    sequentially performing, by a camera module, first and second object scanning processes of scanning the same object;
    reconstructing, by a processor module, a 3D object model, based on a first object image obtained through the first object scanning process and performing pose learning on an object to generate learning data, based on data obtained through a process of reconstructing the 3D object model based on the first object image; and
    reconstructing, by the processor module, a final 3D object model, based on a second object image obtained through the second object scanning process and the learning data,
    wherein the reconstructing of the final 3D object model comprises:
        extracting second feature data of the object from the second object image by using a feature extraction algorithm;
        estimating second pose data of the object by using a pose estimation algorithm, based on the learning data and the second feature data; and
        reconstructing a final 3D object model, based on the second pose data.

2. The method of claim 1, wherein the sequentially performing comprises performing the first and second object scanning processes in a state where at least one of the camera module and the real object is not fixed.

3. The method of claim 1, wherein the sequentially performing comprises:
    performing the first object scanning process of capturing a plurality of depth images of the object at different viewpoints; and
    performing the second object scanning process of capturing a plurality of color images of the object at different viewpoints.

4. The method of claim 1, wherein the generating of the learning data comprises:
    extracting first feature data of the object from the first object image by using a feature extraction algorithm;
    estimating first pose data of the object by using a pose estimation algorithm, based on the first feature data;
    reconstructing 3D object model data based on the first object image by using a 3D reconstruction algorithm, based on the first pose data;
    performing pose learning on the object to generate the learning data, based on the 3D object model data based on the first object image and the first pose data; and
    storing the generated learning data in a storage module to build a database including the learning data.

5. The method of claim 1, wherein the extracting comprises extracting the second feature data, including global feature data and local feature data of the object, from the second object image.

6. The method of claim 1, wherein the reconstructing of the final 3D object model comprises:
    extracting, by using a feature extraction algorithm, a third feature data of the object from the second object image and extracting a fourth feature data of the object from a two-dimensional (2D) object image where the 3D object model based on the first object image is projected onto a 2D plane;
    estimating second pose data by using a pose estimation algorithm, based on the learning data, the third feature data, and the fourth feature data; and
    reconstructing a final 3D object model by using a 3D reconstruction algorithm, based on the second pose data.

7. The method of claim 1, wherein the sequentially performing comprises, before performing the first object scanning process, performing a background scanning process of scanning a background of a specific space where the object is placed, for reconstructing a 3D background model.

8. The method of claim 7, wherein the generating of the learning data comprises:
    removing a background image corresponding to the 3D background model from the first object image to extract a foreground image including the object;
    estimating first pose data of the object, based on the first feature data extracted from the foreground image;
    reconstructing the 3D object model, based on the first pose data; and
    performing the pose learning on the object to generate the learning data, based on the first pose data and the 3D object model.

9. The method of claim 7, wherein the reconstructing of the final 3D object model comprises:
    removing a background image corresponding to the 3D background model from the second object image to extract a foreground image including the object;
    estimating second pose data of the object, based on a third feature data of the object extracted from the foreground image, a fourth feature data of the object extracted from a two-dimensional (2D) object image where the 3D object model based on the first object image is projected onto a 2D plane, and the learning data; and
    reconstructing the final 3D object model, based on the second pose data.

10. The method of claim 1, wherein the first object scanning process is a coarse scanning process of capturing a plurality of depth images of the object at different viewpoints.

11. The method of claim 1, wherein the second object scanning process is a fine scanning process of capturing a plurality of color images of the object at different viewpoints.

12. An apparatus for reconstructing a three-dimensional (3D) model of an object, the apparatus comprising:
    a camera module sequentially performing first and second object scanning processes of scanning the same object; and a processor module reconstructing a 3D object model, based on a first object image obtained through the first object scanning process, performing pose learning on an object to generate learning data, based on data obtained through a process of reconstructing the 3D object model based on the first object image, and reconstructing a final 3D object model, based on a second object image obtained through the second object scanning process and the learning data, wherein the processor module comprises:

a second feature extraction module executing a feature extraction algorithm to extract a third feature data of the object from the second object image and to extract a fourth feature data of the object from a two-dimensional (2D) object image where the 3D object model based on the first object image is projected onto a 2D plane;

a second pose estimation module executing a pose estimation algorithm to estimate second pose data, based on the learning data, the third feature data, and the fourth feature data; and a 3D model reconstruction module executing a 3D reconstruction algorithm to reconstruct a final 3D object model, based on the second pose data.

13. The apparatus of claim 12, wherein the camera module is equipped in a portable electronic device.

14. The apparatus of claim 12, wherein the processor module comprises:

a first feature extraction module executing a feature extraction algorithm to extract first feature data of the object from the first object image;

a first pose estimation module executing a pose estimation algorithm to estimate first pose data of the object, based on the first feature data;

a 3D model reconstruction module executing a 3D reconstruction algorithm to reconstruct 3D object model data based on the first object image, based on the first pose data; and a learning module performing the pose learning on the object to generate the learning data, based on the 3D object model data based on the first object image and the first pose data.

15. The apparatus of claim 12, wherein the camera module comprises:

a depth sensor performing the first object scanning process of capturing a plurality of depth images of the object at different viewpoints; and a color sensor performing the second object scanning process of capturing a plurality of color images of the object at different viewpoints.

16. The apparatus of claim 12, further comprising a storage module storing the generated learning data.

17. A method of reconstructing a three-dimensional (3D) model of an object, the method comprising:

sequentially performing, by a camera module, first and second object scanning processes of scanning the same object;

estimating, by a processor module, first pose data of the object, based on first feature data extracted from a first object image obtained through the first object scanning process and reconstructing a 3D object model, based on the first pose data;

estimating second pose data of the object, based on a third feature data of the object extracted from a second object image obtained through the second object scanning process, a fourth feature data of the object extracted from a two-dimensional (2D) object image where the 3D object model is projected onto a 2D plane, and the first pose data; and reconstructing a final 3D object model, based on the second pose data.

18. The method of claim 17, wherein the first feature data is data extracted from a depth image, and the second feature data is data extracted from a color image.

* * * * *